May 31, 1960     C. P. STEIN     2,938,588
HYDRAULIC JACK ACTUATED DISC TRANSPORT
Filed May 28, 1956     2 Sheets-Sheet 2
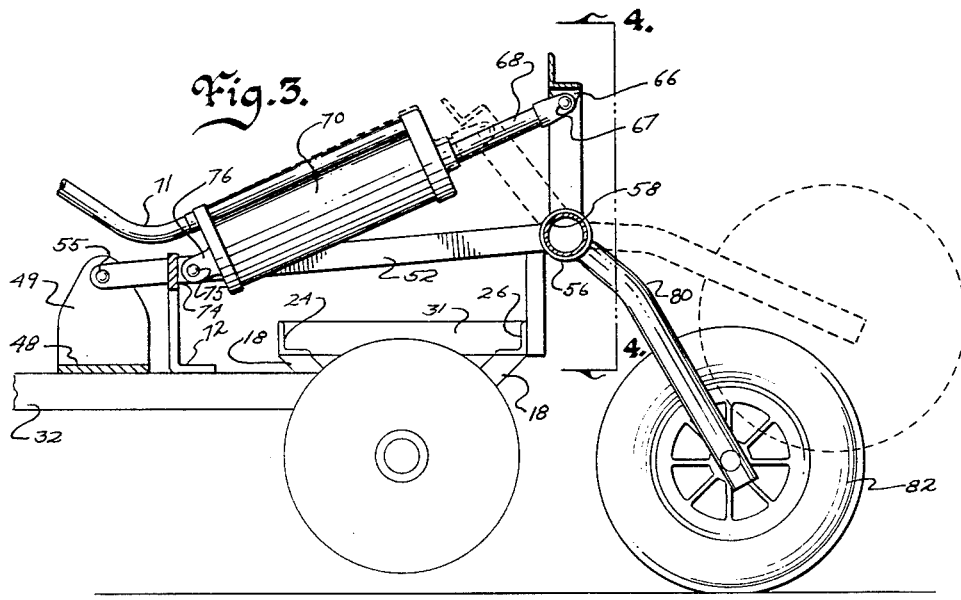
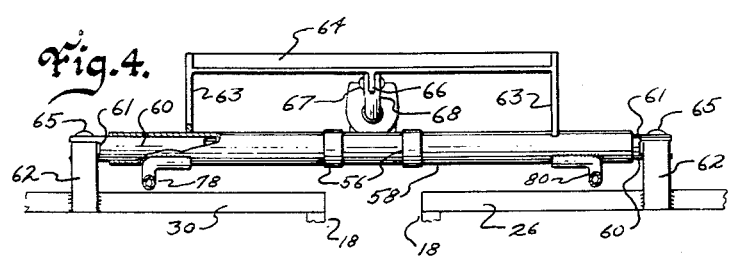
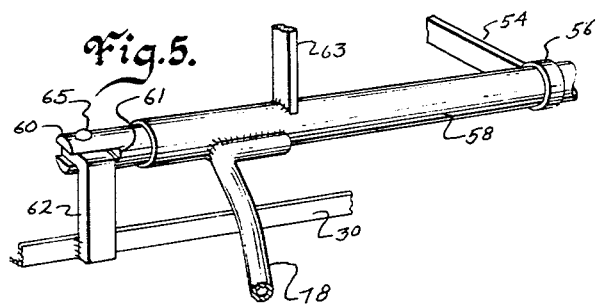
Inventor
Curtis P. Stein
by M. Talbert Dick
Attorney
Witness
Edward P. Seeley United States Patent Office 2,938,588
Patented May 31, 1960

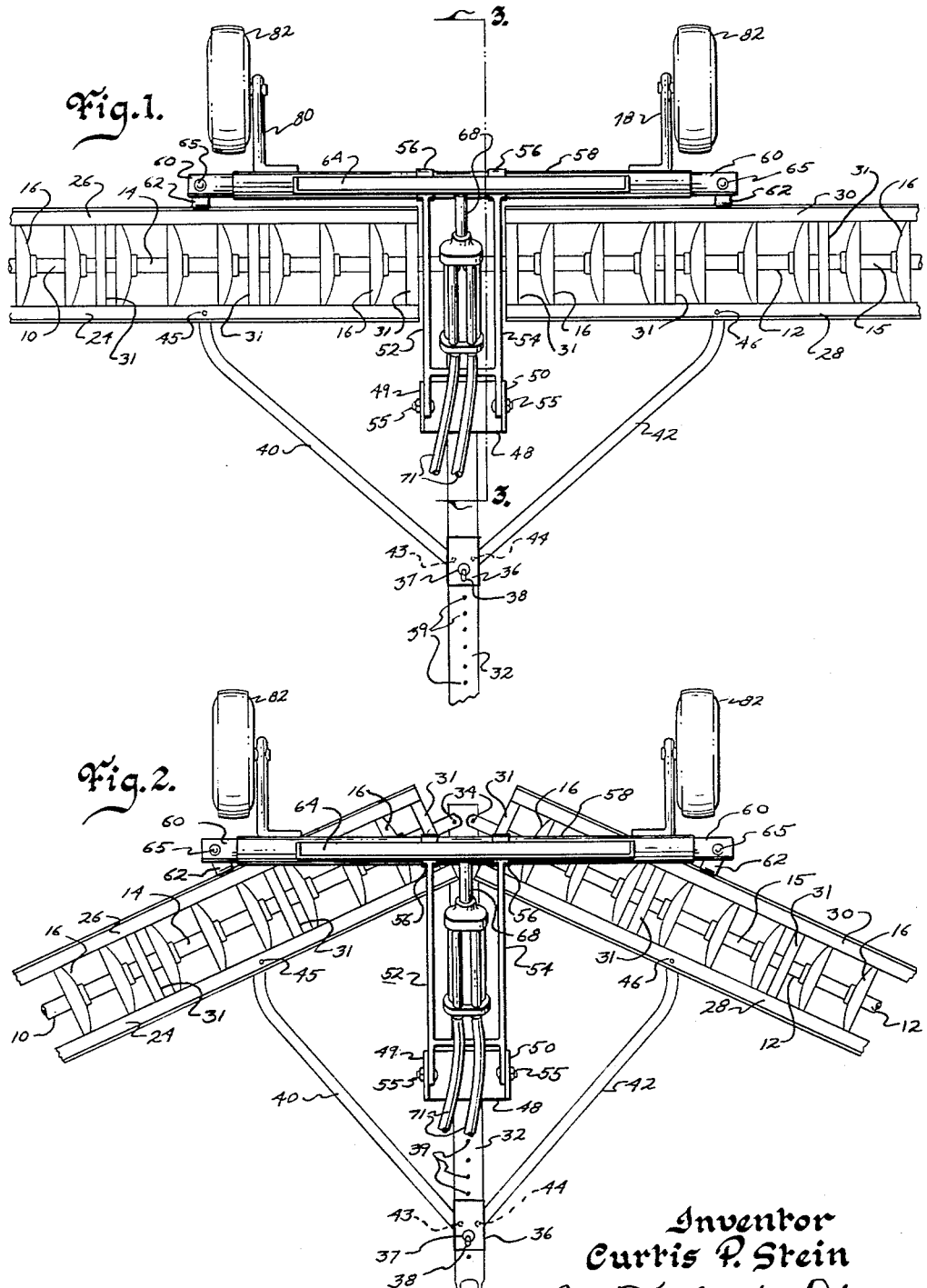

2,938,588

HYDRAULIC JACK ACTUATED DISC TRANSPORT

Curtis P. Stein, Gilmore City, Humboldt County, Iowa

Filed May 28, 1956, Ser. No. 587,812

4 Claims. (Cl. 172—240)

My invention relates to the art of transporting implements operating on the general principle of the farm disc implement and more specifically, to the transportation of the type of disc implements that are capable of having their separate disc units angularly adjustable with respect to each other. I have shown my disc transport adapted to one of these adjustable discs which accomplishes its angular adjustment by changing the relative positions of two adjacent disc units pivotally connected to the rearward end of a tongue member, a slide member selectively adjustable on the forward end of the tongue member, and brace members pivotally connected to both the slide member and the outer end of each of the disc units. This specific type disc, which is generally referred to as a "straight type disc," is one manufactured primarily by the John Deere farm implement company and is commonly used in all farming areas throughout the United States. It is understood, however, that my invention relates to a disc transport that can be adapted to all types of adjustable discs, and which therefore can also be used on discs which have their angular adjustment fixed.

The greatest problem connected with disc transports is that when the transport unit must be operatively connected to an angularly adjustable disc, complicated sets of compound linkage are required to permit relative movement between the disc and the transport unit. The complicated linkage of these devices creates an appreciable maintenance problem, reduces the efficiency of the unit, and usually limits the adaptation of the transport to only a predetermined disc of known dimensions. Furthermore, none of the disc transports known to me can be easily used upon both the straight disc discussed above and the common tandem type disc unit, nor can these known disc transports be adapted for use on both angular adjustable and non-adjustable disc units.

Therefore, it is the principal object of my invention to provide a disc transport which can be adapted to both non-adjustable and angular adjustable disc units.

It is a further object of my invention to provide a disc transport which can be secured to both adjustable and non-adjustable disc units by a single piece of linkage.

It is a further object of my invention to provide a disc transport which can be adapted to discs of different dimensions.

It is a further object of my invention to provide a disc transport which will permit uninhibited angular adjustment of the disc units.

It is a further object of my invention to provide a disc transport that is durable in use, efficient in operation, economical to manufacture and refined in appearance.

These and other objects will be apparent to those skilled in the art.

My invention consists in the construction, arrangement, and combination of the various parts of the device, whereby the objects contemplated are attained as hereinafter more fully set forth, and specifically pointed out in my claims, and illustrated in the accompanying drawings, in which:

Fig. 1 is a top view of my hydraulic jack actuated disc transport with the disc units in their straightened and generally, inoperable, position, Fig. 2 is a top view of my device with the disc units in an angular, operating position, Fig. 3 is a partial sectional view of my device taken on line 3—3 of Fig. 1 and showing my disc transport in its operative position. Broken lines in Fig. 3 illustrate the position of the disc transport when not in use, Fig. 4 is a partial sectional view of my device taken on line 4—4 of Fig. 3. Fig. 4 is at a reduced scale from Fig. 3 and shows the detailed connections between the disc transport and the upper frame of the disc units, and Fig. 5 is a perspective view of the connection shown in Fig. 4.

I have used the numerals 10 and 12 to designate the separate disc units with axle members 14 and 15 and disc elements 16. Rotatably secured to axles 14 and 15 by diagonal braces 18 (as shown in Fig. 3) are conventional disc frame units comprised of parallel spaced apart angle irons 24 and 26, and 28 and 30 with cross braces 31. The adjacent ends of axles 14 and 15 are hinged in a horizontal plane to tongue 32 at the rearward end of the tongue in any conventional manner such as by pins 34. Disposed upon the forward portion of tongue 32 is slide member 36 which completely embraces tongue 32 and is adapted to forward and rearward sliding movement along the tongue. A hole 37 is located in the top of slide member 36 and a conventional spring actuated finger 38 is mounted adjacent to hole 37 and is adapted at times to drop through the hole 37 into any one of the holes 39 in tongue 32. The details of spring actuated finger 38 are not shown in view of the fact that its construction is commonly known and its presence in the drawings in no way comprises what I consider to be my invention. Pivoted to the bottom of slide member 36 are connecting arms 40 and 42 which are connected to the slide member in any convenient manner such as by pins 43 and 44 which are shown by dotted lines in Figs. 1 and 2. The rearward ends of arms 40 and 42 are pivotally connected to angle irons 24 and 28 on the frames of the respective disc units by pins 45 and 46, respectively. The structure thus described is that conventional structure common to nearly all straight discs, and it may be seen that this type disc is changed from the position of Fig. 1 to that of Fig. 2 by merely disengaging finger 38 from its hole in tongue 32, forcing the tongue 32 to the rear back through slide member 36, and then engaging finger 38 back into a more forward hole in the tongue.

My invention, as related to the above described disc unit, is comprised of a base member 48 which is rigidly secured to the upper central portion of tongue 32. Base member 48 has two vertically extending flanges 49 and 50 which rotatably secure arms 52 and 54, respectively, in any convenient manner, such as by the nut and bolt assemblies 55. Disposed on the rearward ends of the arms 52 and 54 are cylindrically shaped ring members 56 whose longitudinal axis are extending in a horizontal plane. Symmetrically inserted through ring members 56 and rotatably secured therein is hollow shaft member 58. Telescopically and rotatably inserted in each end of shaft 58 are rods 60 which have a slot 61 on their outer ends. Inverted L-shaped bars 62 are pivotally mounted in slots 61 by rivets 65. The lower ends of the inverted L-shaped bars 62 are then rigidly connected as by welding or any other convenient means to the rearward angle irons 26 and 30 of disc frames. Other than the base member 48 which is supported on tongue 32, the bars 62 are the only linkage between the disc transport and the disc itself.

Brace members 63 are symmetrically placed and rigidly secured to shaft 58 and are extending radially from the shaft 58 in the same direction. Braces 63 are spaced substantially apart and are rigidly connected by their outer ends with angle iron 64. Rigidly secured to the exterior side and at the midpoint of one of the legs of angle 64 is a laterally disposed pierced ear 66. Rotatably embracing ear 66 by rivet 67 is the slotted end of piston rod 68. Piston rod 68 is operatively connected to the conventional double-acting hydraulic cylinder 70 which is in turn connected to a controllable source of hydraulic pressure by means of tubes 71. This conventional hydraulic cylinder 70 is adapted to forcibly extend and withdraw piston rod 68. The end of cylinder 70 opposite to piston rod 68 is forwardly extended between arms 52 and 54. The forward end of cylinder 70 is then rotatably and operatively connected to the arms 52 and 54 in any convenient manner. In Fig. 3, I have shown a shoe member 72 between arms 52 and 54 and rigidly connected thereto. The shoe member 72 has a pierced ear 74 which is rotatably secured by rivet 75 to the pierced ear 76 on cylinder 70. This is just one of many ways that cylinder 70 can be rotatably operatively connected to arms 52 and 54.

Rigidly secured to the outside of shaft 58 by welding or the like are wheel struts 78 and 80. These struts are located near braces 63 but extend radially from shaft 58 at a substantial angle from braces 63 as shown in Figs. 3 and 5. Rotatably secured to each of struts 78 and 80 are wheels 82.

The normal operation of my device is as follows: When the disc is being used in the field, the wheels 80 and connected structure will assume the position shown by the broken lines in Fig. 3. At that time, the disc elements 16 will be in engagement with the ground and the disc units will probably be in the general angular position shown in Fig. 2, although their exact angular disposition will in no way affect the functioning of the disc transport. In fact, the essential feature about my disc transport is that it in no way interferes with the angular adjustment of the disc unit. Now when it is desired to move the disc unit from one place to another as from one field to an adjoining field, the source of hydraulic pressure is allowed to act through tube 71 into cylinder 70, thus forcing the piston rod 68 into the position shown in Fig. 3. The piston rod 68, operatively and pivotally connected to the frame formed by angle 64 and braces 63, then rotates hollow shaft 58 in a rearward direction. The wheel units 82, which are rigidly secured to shaft 58, are in turn rotated downward from their elevated position until the wheels engage the ground. The piston rod 68 is of such predetermined length, in relation to the respective dimensions of braces 63 and wheel struts 78 and 80, that the wheels continue to rotate on shaft 58 a short distance after they have first engaged the ground. It is this continued rotation of the wheels with shaft 58 that lifts the disc unit from the ground, and, as aptly shown in Fig. 3, the disc unit will remain above the ground as long as the hydraulic pressure keeps piston rod 68 in its extended position. The withdrawal of the piston rod by the reversal of hydraulic pressure in cylinder 70 similarly will rotate wheels 82 and shaft 58, but the rotations will take place in an opposite direction so as to once again elevate the wheels and lower the disc unit.

It can be seen from the above description of my disc transport, that the transport unit permits complete freedom of angular adjustment of the disc units, because the only movement of parts on the disc transport when the disc units are changed from one position to another, is the free telescoping action of rods 60 and pivoting of bars 62. The rod 60, being pivotally connected to the disc units and telescopically secured to the disc transport, permits angular adjustment of the disc without interference from the transport, and this phenomena is the essence of my invention. This simple connection between disc unit and transport permits angular adjustment of the disc whether the transport is in non-operable or operable position. Thus, if the straightened disc is mounted on the transport, and the lateral width of the disc needs to be decreased in order to negotiate a narrow gate, for instance, the disc could be changed from the position shown in Fig. 1 to the position of Fig. 2 while the disc units were held completely off the ground by the transport. Furthermore, the telescoping action of rods 60 in hollow shaft 58 would permit my disc transport to be adapted to discs of different lateral dimensions. It is also apparent that the simplicity of the telescoping-pivoting connection means represented by shaft 58, rods 60 and L-shaped bars 62 would not interfere with a tandem angularly adjustable disc unit which was secured in any conventional manner to the disc units shown in applicant's drawings. This latitude in the adaptability of my disc transport to either a straight disc or a tandem disc is possible through the independent action of the disc transport brought about by the above described telescoping-pivoting connection means between disc unit and transport. Relatively speaking, the disc units, whether adjustable or not, never know that the transport is present.

It may be seen that my invention, as described above, accomplishes the stated objectives and clearly defines its advantages over other known disc transports.

Some changes may be made in the construction and arrangement of my hydraulic jack actuated disc transport without departing from the real spirit and purpose of my invention, and it is my intention to cover by my claims, any modified forms of structure or use of mechanical equivalents which may be reasonably included within their scope.

I claim:

1. In combination, a disc implement having a plurality of angular adjustable disc units supporting a disc frame; and a disc transport, comprising, a hollow shaft member, a rod telescopically and rotatably supported within each end of said hollow shaft member and having free sliding movement therein, said rods extending from the ends of said hollow shaft member and being operatively pivotally connected to the frame of said disc at their outer ends, a plurality of struts rigidly secured to said hollow shaft member and extending radially therefrom, a wheel member rotatably attached to each of said strut members, and means connected to said hollow shaft member for rotating said hollow shaft member at times.

2. In combination, a disc implement having a plurality of angular adjustable disc units supporting a disc frame; and a disc transport, comprising, a hollow shaft member, a rod telescopically and rotatably supported within each end of said hollow shaft member and having free sliding movement therein, said rods extending from the ends of said hollow shaft member and each rod being pivotally connected by its outer end to a linkage member, said linkage members being rigidly connected to the frame of said disc, a plurality of struts rigidly secured to said hollow shaft member and extending radially therefrom, a wheel member rotatably attached to each of said strut members, and means connected to said hollow shaft member for rotating said hollow shaft member at times.

3. In combination, a disc implement having a plurality of angular adjustable disc units supporting a disc frame; and a disc transport, comprising, a hollow shaft member, a rod telescopically and rotatably supported within each end of said hollow shaft member and having free sliding movement therein, said rods extending from the ends of said hollow shaft member and each rod being pivotally connected by its outer end to the upper portion of an inverted L-shaped bar, the lower portion of said L-shaped bars being rigidly connected to the frame of said disc, a plurality of struts rigidly secured to said hollow shaft member and extending radially therefrom, a wheel member rotatably attached to each of said strut members, and means connected to said hollow shaft member for rotating said hollow shaft member at times.

4. In combination, a disc implement having a plurality of angular adjustable disc units supporting a disc frame; and a disc transport, comprising, a hollow shaft member, a rod telescopically and rotatably supported within each end of said hollow shaft member and having a free sliding movement therein, said rods extending from the ends of said hollow shaft member and each rod having a slot in its outer end, an inverted L-shaped bar having its upper portion pivotally connected within the slot of each of said rods, the lower portion of said inverted L-shaped bar rigidly connected to the frame of said disc, a plurality of struts rigidly secured to said hollow shaft member and extending radially therefrom, a wheel member rotatably attached to each of said strut members, and means connected to said hollow shaft member for rotating said hollow shaft member at times.

References Cited in the file of this patent
UNITED STATES PATENTS

| | | |
|---|---|---|
| 2,286,305 | Priestley | June 16, 1942 |
| 2,704,021 | Brundage | Mar. 15, 1955 |